United States Patent Office 3,788,819
Patented Jan. 29, 1974

3,788,819
METHOD OF CRYSTALLIZING USING MAGNETIC MATERIALS
Earl Clarence Oden, P.O. Drawer "CN,"
State College, Miss. 39762
No Drawing. Filed June 21, 1971, Ser. No. 155,316
Int. Cl. B01d 9/04
U.S. Cl. 23—300                                              8 Claims

ABSTRACT OF THE DISCLOSURE

The invention relates to a method of separating at least one component from a solution mixture of chemical compounds having a narrow range of boiling points. The separation comprises cooling the mixture to about the saturation point and adding thereto a magnetic material which has been cooled to below the super saturation temperature of the solution. Crystals of the component formed on the magnetic material are separated from the solution by magnetic separation means.

BACKGROUND OF THE INVENTION

This invention relates to a method of separating chemical compounds from solution and more particularly to a method of separating isomeric compounds from each other by crystallization and magnetic procedures.

Xylenes, particularly para-xylene, are becoming increasingly in demand as basic raw materials for various commercial processes, such as in the synthetic fiber industry wherein uses for polyesters have been developed.

Para-xylene is a clear liquid at normal temperatures and pressures as well as the other isomers, ortho and meta-xylenes. Separation of the individual isomers by distillation procedures is economically unfeasble because the boiling points of the isomers differ by only about 1° to 5° C. However, there is a wide variation in the freezing points (melting points) of the individual isomers, being 13.2°, −25° C. and −47° C. for para, ortho, and meta-xylenes respectively.

The petroleum refining industries produce large quantities of the xylene isomers, especially in the catalytic reforming operations. There are several large process recovery plants in commercial operation that produce in the millions of pounds per year each of almost pure para-xylene (greater than 99% purity). The process routes involve some means of selective crystallization of the para-xylene from a narrow boiling range fraction while leaving the ortho, meta-xylenes, the toluene, ethyl benzene and other hydrocarbon impurities in the solution. These process routes require large scale refrigeration units of some type for crystallizing the para-xylene and then some method for separating the crystals most common of which is believed to be centrifuging.

One method for the separation of the isomers that is used rather extensively is to mix liquid carbon dioxide with prechilled hydrocarbon cuts having narrow boiling ranges that contain the xylenes with some relatively small amounts of hydrocarbons that normally boil below as well as above the xylene isomers. These are circulated in a large crystallizer chamber in the presence of a liquid refrigerant such as liquid carbon dioxide at slightly above to slightly below atmospheric pressure, the chilled solution is pumped to a second stage crystallizer that operates below atmospheric pressure. Refrigerant vapor is constantly boiled off while crystals are circulated along with the mother liquor so as to allow crystal growth in the second stage crystallizer. A continuous stream of crystals and mother liquor is drawn off for removal of the crystals by centrifuging or by other means. The carbon dioxide that is vaporized off in each crystallizer is compressed, chilled, and condensed for return to the crystallizer chambers. If crystallization of the para-xylene is taken below about 7 to 9% para-xylene left in solution, the mother liquor and para-xylene present along with other impurities are apt to form a eutectic at which all freezes. Mother liquor and crystals are taken to large expensive stainless steel centrifuges and the para-xylene crystals are removed in two or three stage washing centrifuges. The mother liquor that results contains about 7–9% para-xylene and can be blended into gasoline, used for general purpose aromatic solvents, or else sent to isomerization units for conversion to para-xylene and then returned to the system for recovery.

BRIEF SUMMARY OF THE INVENTION

An object of this invention is to provide a novel process for the separation of isomers of compounds having boiling points of small variation but having freezing points of significant variation.

Another object of this invention is to provide a process for the separation of isomers using crystallization and magnetic procedures.

Another object of this invention is to provide a method of increasing the capacity of existing crystallization separation equipment.

Generally, the invention involves the separation of an individual isomer such as para-xylene from a solution of isomers by chilling the solution to about the saturation point and exposing the solution to magnetic materials that have been cooled to temperatures below the super-saturated temperature of the solution and above the temperature of the freezing point of the other isomers. Crystals of para-xylene formed on the magnetic materials are then removed from the solution by various means such as magnetized belts, chains, pulleys, etc.

DETAILED DESCRIPTION OF THE INVENTION

The present invention is useful for the separation of mixtures of chemical compounds having a narrow range of boiling points and that are difficult to separate by distillation procedures. Specifically, the invention will be described with reference to the separation of para-xylene from ortho and meta-xylene.

A solution comprising the three isomers of xylene is chilled to about the saturation point and is then exposed to magnetic materials that have been cooled to temperatures below the super-saturated temperature of the solution. Magnetic materials used can be magnetic iron and iron oxide in powder form, or in various shapes, such as hollows, spheres, and the like. The magnetic materials may be loose or attached to magnetized belts, chains, pulleys, etc., in any manner that will permit the crystals of p-xylene to adhere.

The addition of the chilled magnetic iron to the solution causes crystals of p-xylene to form whereas the ortho and meta-xylenes remain in solution. The magnetic iron probably causes the crystals to form thereon and may also become embedded in the crystals. In either case, the presence of the magnetic iron in the crystals facilitates the removal of the crystals from the solution.

Removal of the p-xylene crystals containing the magnetic iron is accomplished by passing a magnetized belt around pulleys into the solution or barely over or just touching the surface of the solution, preferably being circulated. Another removal method is to discharge the solution containing the p-xylene crystals with the embedded magnetized iron from the crystallizing chamber to a conventional magnetic separator which is typically used to separate magnetic substances from slurries, solutions, or mixtures of solids.

The separated crystals of p-xylene are washed with p-xylene solutions to remove mother liquor. The wash solution may be sufficiently warm to dissolve a slight amount of the p-xylene crystal which produces a remaining crystal of greater purity. Using this procedure, almost any degree of purity can be obtained as desired, but most of the wash solution must be recirculated to the crystallizer chamber for recovery and the amount recirculated would be almost directly proportional to the degree of purity desired.

The removal of the magnetic iron from the crystals obtained, having the desired purity, can be accomplished by dissolving the crystals in hot p-xylene product of semilar purity. Partially coated and non-coated magnetic iron is obtained for re-use in the crystallization step and is rechilled by passing it through a refrigerant that can be easily vaporized such as liquid carbon dioxide, nitrogen, ethane, etc.

An added aspect of the method of this invention is the ability to increase the capacity of existing crystallization equipment, described heretofore, without requiring additional centrifuges. Magnetic materials, such as magnetic iron oxide can be suspended or circulated in existing crystallizing equipment in the form of hollow spheres having a gas entrapped therein that would have essentially the same density as the solution to be crystallized. The hollow spheres are super-cooled to below the freezing point of the p-xylene and become coated with p-xylene. The spheres are kept in the crystallizer until growth has reached the optimum economic size for separation by magnetic separators. The separators can be either of the type that dip into the solution as described heretofore, or the solution with the crystals can be removed from the crystallizer and passed over or around revolving magnetic belts, which would remove the crystals.

A decided advantage of the method of the invention using magnetic materials in conventional crystallizing equipment is the fact that the p-xylene in the solution (mother liquor) is reduced to a lower concentration than is normally possible when using non-magnetic commercial procedures. The lower concentration is obtained by having better control of the solution. Thus, by super-cooling the magnetic materials and removing the solution just before the eutectic composition is reached, a more selective crystallization of the p-xylene are removed in the centrifuges or other separation means. In this manner, the capacity of present conventional equipment is increased.

A further variation of this invention involves the use of metallic materials such as metal balls. The metallic material is properly chilled and the p-xylene crystals grown on the chilled surfaces in the solution. The metallic material having the crystals thereon is separated from the solution by means of a magnet or a screen. After removal of the crystals from the metallic material, it is rechilled and recycled to the solution.

EXAMPLE

Para-xylene feedstock having approximately the following composition (by volume percent) was treated as described below.

| | |
|---|---|
| Toluene | 1.1 |
| Ethyl benzene | 19.2 |
| Px | 19.8 |
| Mx | 40.9 |
| Ox | 17.9 |
| $C_9$ | 1.1 |
| $C_{10}$ | N.A. |

This feed was chilled in a flask set in a bath of liquid nitrogen, and the flask contents agitated until crystallization began. At the same time, iron oxide filings were placed in a separatory funnel having a filter in the bottom. The magnetic iron filings were covered with liquid nitrogen, and the nitrogen escaped as evaporation and chilling took place. At the same time, a small electromagnet was chilled by having it sit in liquid nitrogen which was vaporizing off. When the latter two were chilled to about (—90° F.) to (—100° F.) the liquid nitrogen was quickly removed from the filings, and these poured into the solution of feed that was chilled to a saturated or slightly super-saturated state. The flask was lowered an additional depth into the nitrogen to obtain a lower temperature. Stirring was continued; and when crystals had accumulated, the liquid remaining was decanted off, and the crystals removed and exposed to the electromagnet that had been in liquid nitrogen just previously. It was difficult to be absolutely sure whether most of the crystals were built up on the iron filings or whether iron filings were trapped among the crystals. Nitrogen was used because of the ease of obtaining the lower temperatures as well as the availability.

The electromagnet would lift about 20 parts by weight of para-xylene per part iron oxide filings. This was measured by allowing the crystals to melt then weighing the weight of liquid and the weight of iron filings.

What is claimed is:

1. A method of separating a solution mixture of chemical compounds having a narrow range of individual boiling points and a broader range of individual freezing points and in which the component having the highest freezing point is in a concentration such that a reduction of temperature of the solution mixture will saturate the solution in that said component, comprising cooling said solution to about the saturation point of the said component, adding to said solution a magnetic material which has been cooled to a temperature level below the saturated temperature of said solution and sufficient to form crystals of the said component that has become saturated in said mixture of chemical compounds, and removing said magnetic material and crystals formed thereon from said solution by magnetic separation means.

2. The method of claim 1 wherein said magnetic material is magnetic iron oxide.

3. The method of claim 1 wherein said magnetic material is a metal.

4. The method of claim 1 wherein said magnetic material is powdered.

5. The method of claim 1 wherein said magnetic material is a hollow object having approximately the density of said solution.

6. The method of claim 1 wherein said mixture of chemical compounds comprises isomers of xylene and p-xylene is separated therefrom.

7. The method of claim 1, wherein said magnetic material is cooled by means of a vaporizable liquid gas.

8. The method of claim 1, wherein said magnetic materials and crystals removed from said solution are washed with a liquid solution of the crystal compound.

References Cited

UNITED STATES PATENTS

| | | | |
|---|---|---|---|
| 2,398,725 | 4/1946 | Schutte | 209—8.1 |
| 2,666,304 | 1/1954 | Ahrel | 62—58 |
| 2,691,443 | 10/1954 | Schoenlaub | 209—8 |
| 2,954,122 | 9/1960 | Colburn | 209—8 |
| 3,212,282 | 10/1965 | Stroller | 62—58 |
| 3,251,192 | 5/1966 | Rich, Jr. et al. | 62—58 |
| 3,367,123 | 2/1968 | Schambra | 62—58 |
| 3,442,801 | 5/1969 | Anderson | 62—58 |
| 3,461,679 | 8/1969 | Goldberger | 62—58 |
| 3,605,426 | 9/1971 | Chao et al. | 62—58 |

NORMAN YUDKOFF, Primary Examiner

R. T. FOSTER, Assistant Examiner

U.S. Cl. X.R.

62—58; 209—8.1